United States Patent
Oshima (10) Patent No.: US 9,522,572 B2
(45) Date of Patent: Dec. 20, 2016

(54) MOTORCYCLE TIRE

(71) Applicant: BRIDGESTONE CORPORATION, Chuo-ku, Tokyo (JP)

(72) Inventor: Masatomo Oshima, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 0 days.

(21) Appl. No.: 14/903,109

(22) PCT Filed: Jun. 23, 2014

(86) PCT No.: PCT/JP2014/003361
§ 371 (c)(1),
(2) Date: Jan. 6, 2016

(87) PCT Pub. No.: WO2015/015701
PCT Pub. Date: Feb. 5, 2015

(65) Prior Publication Data
US 2016/0159153 A1    Jun. 9, 2016

(30) Foreign Application Priority Data

Jul. 29, 2013   (JP) .................................. 2013-156842

(51) Int. Cl.
*B60C 9/18* (2006.01)
*B60C 9/20* (2006.01)
(Continued)

(52) U.S. Cl.
CPC . *B60C 9/20* (2013.01); *B60C 9/02* (2013.01); *B60C 9/28* (2013.01); *B60C 11/00* (2013.01);
(Continued)

(58) Field of Classification Search
CPC .. B60C 9/18; B60C 9/1807; B60C 2009/2025; B60C 2009/10
See application file for complete search history.

(56) References Cited

FOREIGN PATENT DOCUMENTS

| CN | 1550359 A | 12/2004 |
|---|---|---|
| CN | 1675078 A | 9/2005 |

(Continued)

OTHER PUBLICATIONS

Machine translation of JP 2005-280404, 2005.*
(Continued)

*Primary Examiner* — Justin Fischer
(74) *Attorney, Agent, or Firm* — Kenja IP Law PC (57) ABSTRACT

A motorcycle tire includes, on an outer circumferential side of a crown region of a radial carcass, a belt layer, a single auxiliary belt layer, and a tread rubber in the stated order, a periphery width of the auxiliary belt layer being greater than a periphery width of the belt layer. The cords of the auxiliary belt layer extend in a direction in which an inclination angle of the cords of the auxiliary belt layer with respect to a tire circumferential direction gradually decreases from each of both ends of a tire equatorial region including a tire equatorial plane toward a corresponding ¼ position which is at a distance of ¼ of the periphery width of the auxiliary belt layer from the tire equatorial plane along a periphery of the auxiliary belt layer, and the inclination angle in the ¼ position is 60° or more and 85° or less.

3 Claims, 6 Drawing Sheets (51) Int. Cl.
*B60C 9/28* (2006.01)
*B60C 9/02* (2006.01)
*B60C 11/00* (2006.01)
*B60C 15/00* (2006.01)

(52) U.S. Cl.
CPC ....... *B60C 15/00* (2013.01); *B60C 2009/2022* (2013.04); *B60C 2009/2025* (2013.04); *B60C 2200/10* (2013.04)

(56) References Cited

FOREIGN PATENT DOCUMENTS

| | | | |
|---|---|---|---|
| JP | 2005-254992 | * | 9/2005 |
| JP | 2005-280404 | * | 10/2005 |
| JP | 2005-535505 | A | 11/2005 |
| JP | 2007-182098 | A | 7/2007 |
| JP | 2009090833 | A | 4/2009 |
| JP | 2010-126005 | A | 6/2010 |
| JP | 2013141884 | A | 7/2013 |
| WO | 2004018237 | A1 | 3/2004 |

OTHER PUBLICATIONS

Sep. 9, 2014, International Search Report issued in International Patent Application No. PCT/JP2014/003361.

Sep. 2, 2014, Notification of Reasons for Refusal issued by the Japan Patent Office in the corresponding Japanese Patent Application No. 2013-156842.

* cited by examiner

MOTORCYCLE TIRE

TECHNICAL FIELD

The disclosure relates to a motorcycle tire that improves gripping performance and steering stability and suppresses uneven wear of the tread.

BACKGROUND

A motorcycle turns with the vehicle body leaning to the road surface, unlike a four-wheeled vehicle. A motorcycle tire accordingly has the property that the crown portion of the tread has a semicircular edge shape whose curvature is greater than that of a four-wheeled vehicle tire, and the center portion of the tread comes into contact with the ground during straight running and the end portion of the tread comes into contact with the ground during turning. Such motorcycles have been subject to various improvements to enhance steering stability during straight running or turning.

For example, Patent Literature (PTL) 1 discloses a motorcycle tire in which the width of a spiral belt layer formed by winding a reinforcing member in parallel with the tire equatorial plane is 0.5 to 0.8 times the tread width, and the average value of the total tire thickness in the area where the belt layer is formed is smaller than that in the area where the belt layer is not formed. This tire has a larger footprint area of the tread during turning than conventional tires and also has a reduced difference in rigidity of the tread surface, in order to improve traction performance when accelerating from deep cornering during which the vehicle body is significantly leaned and stability when leaning the vehicle body.

CITATION LIST

Patent Literature

PTL 1: JP 2010-126005 A

SUMMARY

Technical Problem

The motorcycle tire mentioned above is intended to reduce the difference in rigidity between the area where the spiral belt layer is formed and the area where the spiral belt layer is not formed, by adjusting the total tire thickness. Such a structure, however, may have difficulty in maintaining desired performance when the wear of the tread progresses as the running distance of the tire increases.

It could therefore be helpful to provide a motorcycle tire that improves gripping performance and steering stability more reliably and suppresses uneven wear of the tread.

Solution to Problem

We provide the following:

(1) The disclosed motorcycle tire is a motorcycle tire that includes, on an outer circumferential side of a crown region of a radial carcass, a belt layer, a single auxiliary belt layer, and a tread rubber in the stated order, a periphery width of the auxiliary belt layer being greater than a periphery width of the belt layer, wherein the cords of the auxiliary belt layer extend in a direction in which an inclination angle of the cords of the auxiliary belt layer with respect to a tire circumferential direction gradually decreases from each of both ends of a tire equatorial region including a tire equatorial plane toward a corresponding ¼ position which is at a distance of ¼ of the periphery width of the auxiliary belt layer from the tire equatorial plane along a periphery of the auxiliary belt layer, and the inclination angle in the ¼ position is 60° or more and 85° or less.

This structure reduces the shearing rigidity of the tread middle region to prevent slip in the middle region, thus particularly improving the gripping performance of the tread during straight running and improving steering stability. Moreover, since the difference in rigidity between the tread middle region and the tread side regions is reduced, uneven wear of the tread is suppressed.

(2) In the disclosed motorcycle tire, the cords of the auxiliary belt layer preferably extend in a direction in which the inclination angle gradually decreases from the ¼ position toward an end of the auxiliary belt layer.

This structure supplements the rigidity in the tire circumferential direction in the area where the belt layer is not formed in each tread side region, thus particularly improving steering stability during turning and suppressing uneven wear of the tread.

(3) In the disclosed motorcycle tire, the inclination angle of the cords of the auxiliary belt layer in an end of the auxiliary belt layer is preferably 70° or more and 85° or less.

This structure further improves steering stability during turning, and suppresses uneven wear of the tread more reliably.

(4) In the disclosed motorcycle tire, the cords of the auxiliary belt layer preferably have an inflection point in the ¼ position or outward from the ¼ position in a tire width direction, and extend in a direction in which the inclination angle gradually increases from the inflection point toward an end of the auxiliary belt layer.

This structure improves traction performance when accelerating from deep cornering during which the vehicle body is significantly leaned.

(5) In the disclosed motorcycle tire, the inclination angle of the cords of the auxiliary belt layer in the end of the auxiliary belt layer is preferably 70° or more and 90° or less.

This structure further improves the aforementioned traction performance.

Here, the "tire equatorial region" is the range of 20% or less of the periphery width of the tread surface, outward in the tire width direction from the tire equatorial plane.

The "periphery width" is the length of the belt layer, auxiliary belt layer, or tread surface measured along its outline in a cross section in the tire width direction, in a state where the tire is attached to an applicable rim, filled to a predetermined internal pressure, and placed under no load. The "inclination angle with respect to a tire circumferential direction" of the auxiliary belt layer is also measured in a state where the tire is attached to the applicable rim, filled to the predetermined internal pressure, and placed under no load.

The "inclination angle" is the acute angle of the tangent line at any point on the cords with respect to the tire circumferential direction, in a development plan view of the internal structure of the tire.

The "applicable rim" is a standard rim (or approved rim or recommended rim) in applicable size described in an effective industrial standard in areas where tires are produced or used, such as JATMA Year Book in Japan, ETRTO Standards Manual in Europe, or TRA Year Book in the United States.

The "predetermined internal pressure" is the air pressure corresponding to the maximum load capability in applicable size/ply rating described in JATMA, etc.

Advantageous Effect

It is thus possible to provide a motorcycle tire that improves gripping performance and steering stability and suppresses uneven wear of the tread.

DETAILED DESCRIPTION

A motorcycle tire (hereafter also simply referred to as a tire) according to the disclosure is described in detail below by way of embodiments, with reference to drawings.

Figure 1:
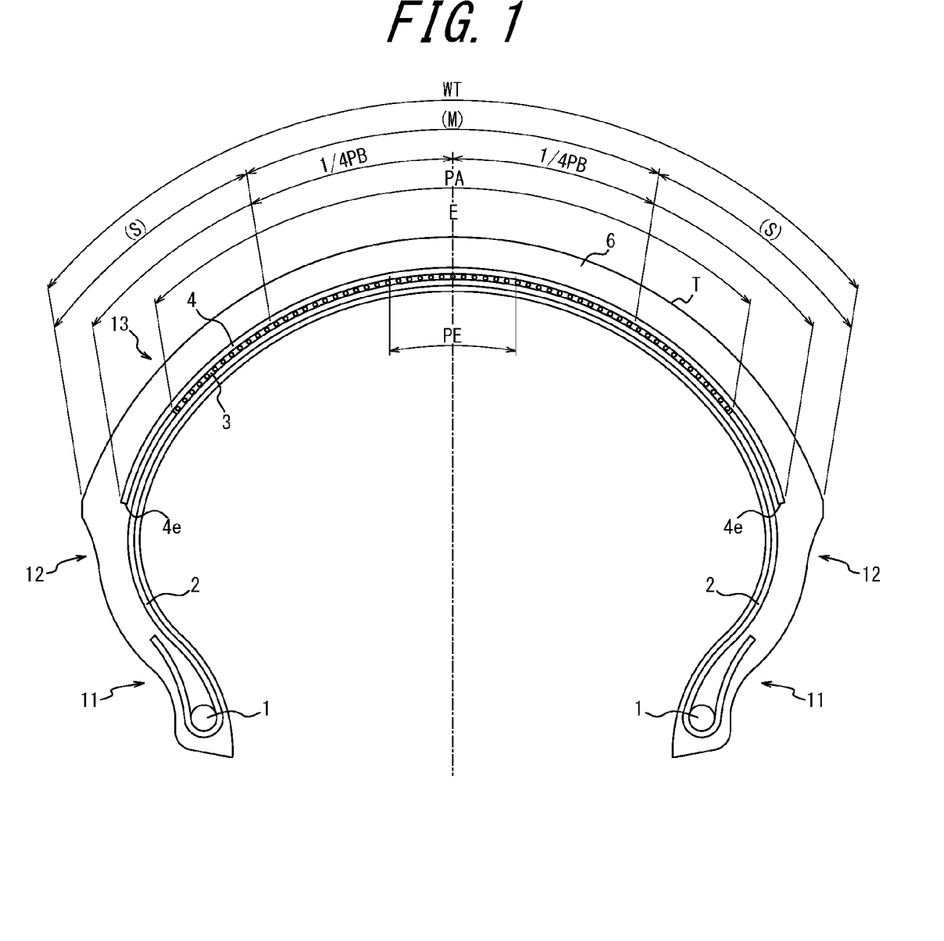
FIG. 1 is a cross-sectional view of a motorcycle tire according to one of the embodiments in the width direction.

FIG. 1 is a cross-sectional view of a tire according to one of the embodiments in the tire width direction. The disclosed tire includes a carcass 2 made up of one or more radial carcass plies toroidally extending between a pair of bead portions 11 and forming a frame of: a pair of sidewall portions 12 located on the outer side of the respective bead portions 11 in the tire radial direction; and a tread portion 13 located between the sidewall portions 12. The tire includes, on the outer circumferential side of the crown region of the carcass 2, a belt layer 3 made up of a plurality of rubber-coated cords, a single auxiliary belt layer 4 made up of a plurality of rubber-coated cords, and a tread rubber 6 in this order.

Figure 2:
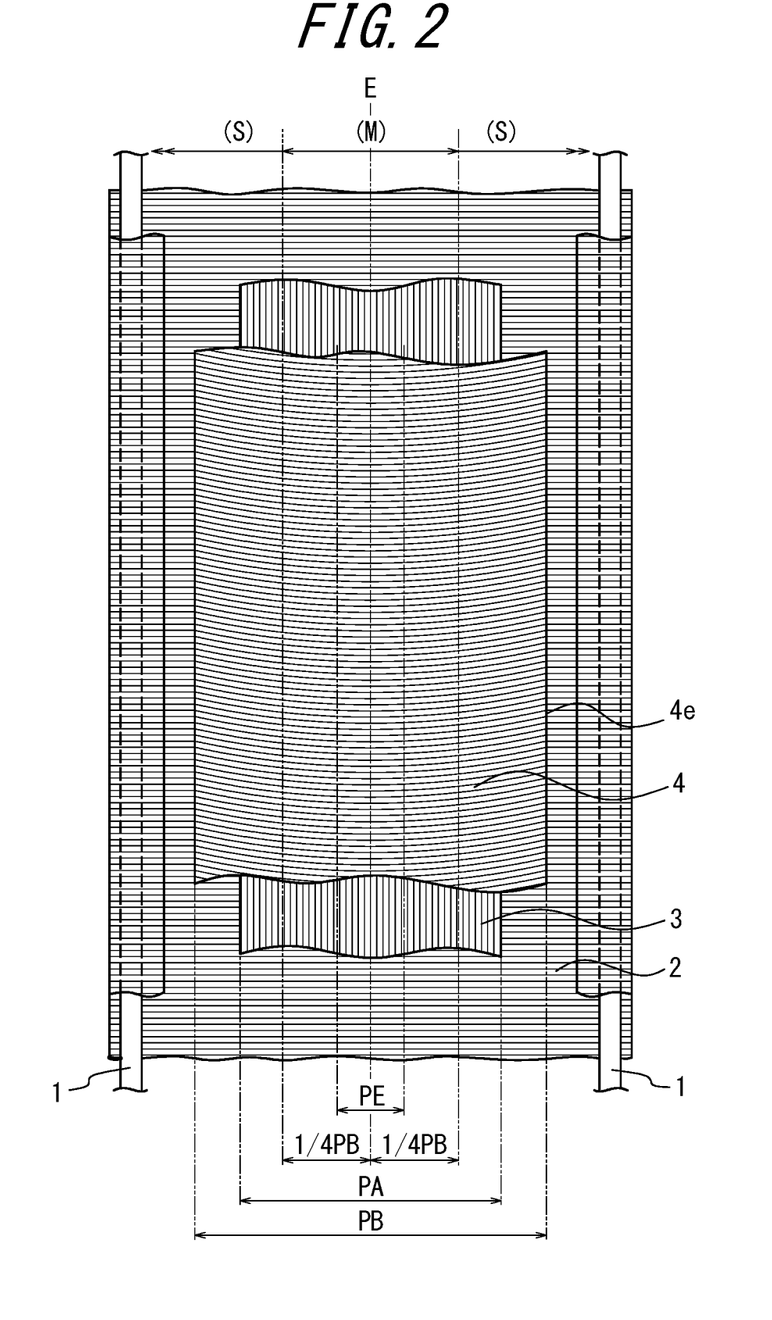
FIG. 2 is a partial development plan view illustrating the internal structure of the tire in FIG. 1.

In detail, the belt layer 3 is formed by winding rubber-coated cords at an inclination angle of 0° or more and 10° or less with respect to the tire circumferential direction, and the auxiliary belt layer 4 is formed by arranging rubber-coated cords as described below. FIG. 2 is a development plan view of the internal structure of the tire in FIG. 1 as seen from directly above the tread 6. As illustrated in the drawing, the periphery width PB of the auxiliary belt layer 4 is greater than the periphery width PA of the belt layer 3 situated on the inner circumferential side of the auxiliary belt layer 4. In this example, the respective center positions of the belt layer 3 and auxiliary belt layer 4 in the tire width direction are both in the tire equatorial plane E.

The disclosed tire has an important feature that the cords $C_4$ of the auxiliary belt layer 4 extend in the direction in which the inclination angle with respect to the tire equatorial plane E gradually decreases from each of both ends of the tire equatorial region PE including the tire equatorial plane E toward the corresponding ¼ position which is at a distance of ¼ of the periphery width PB of the auxiliary belt layer 4 from the tire equatorial plane E along the periphery of the auxiliary belt layer 4.

Figure 3:
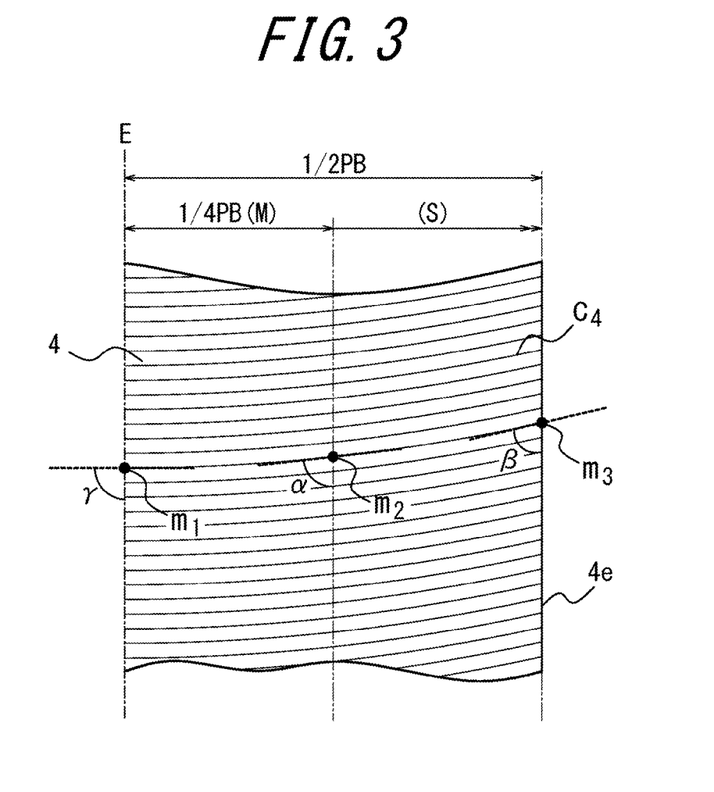
FIG. 3 is an enlarged view of a part in FIG. 2.

In other words, the cords $C_4$ of the auxiliary belt layer 4 gradually decrease in inclination angle so that the inclination angle α of the tangent line at a point $m_2$ in the ¼ position with respect to the tire circumferential direction is smaller than the inclination angle γ of the tangent line at a point $m_1$ in the tire equatorial plane E with respect to the tire circumferential direction, as illustrated in FIG. 3 which partially enlarges the partial development view in FIG. 2.

The following describes the reason for extending the cords $C_4$ of the auxiliary belt layer 4 in this way, where the region in the tread 6 from the tire equator E to the ¼ position of the auxiliary belt layer 4 is referred to as a tread middle region M and the other regions on both sides of the tread middle region each as a tread side region S.

In the case where the cords $C_4$ of the auxiliary belt layer 4 extend in the direction in which the inclination angle with respect to the tire equatorial plane E gradually decreases from each of both ends of the tire equatorial region PE toward the corresponding ¼ position of the auxiliary belt layer 4 as mentioned above, the cords $C_4$ of the auxiliary belt layer 4 extend always substantially perpendicularly to input of force (tangential force) in the front-back direction of the vehicle by action of a driving force when increasingly leaning the vehicle body to the road surface, so that the shearing rigidity of the tread is kept low. Meanwhile, the cords $C_4$ of the auxiliary belt layer 4 extending in the belt width direction maintain appropriate rigidity to input of force (lateral force) in the right-left direction of the vehicle by action of a centrifugal force generated during cornering. By preventing slip in the tread surface T in this way, the gripping force of the tread 6 is enhanced to obtain favorable traction, thus improving steering stability.

Moreover, while there is a difference in rigidity between the tread middle region M sufficiently reinforced by the belt layer 3 and the tread side region S not so much reinforced by the belt layer 3, the auxiliary belt layer 4 supplements the rigidity of the area where the belt layer 3 is not formed in the tread side region S, but does not excessively increase the rigidity of the tread middle region M as mentioned above. This reduces the difference in rigidity between these regions, with it being possible to suppress uneven wear of the tread 6. In addition, reducing the difference in rigidity contributes to higher stability when leaning the vehicle body to the road surface.

In the disclosed motorcycle tire, the inclination angle α in the ¼ position needs to be 60° or more and 85° or less.

In the case where the inclination angle α is less than 60°, the extension direction of the cords $C_4$ of the auxiliary belt layer 4 from each of both ends of the tire equatorial region PE toward the ¼ position approaches the direction along the tangential force input to the tire, and the shearing rigidity of the tread middle region M increases. This causes slip in the tread surface T, and decreases traction performance. Besides, the difference in rigidity between the tread middle region M and the tread side region S increases, which makes the tread 6 more susceptible to uneven wear.

In the case where the inclination angle α is more than 85°, the angle relationship between the extension direction of the cords $C_4$ of the auxiliary belt layer 4 and the direction of the tangential force input to the tread 6 varies significantly depending on how much the vehicle body is leaned to the road surface. This tends to cause lower stability when leaning the vehicle body.

As mentioned earlier, the "tire equatorial region PE" is the range of 20% or less of the periphery width WT of the tread surface T, outward in the tire width direction from the tire equatorial plane E. In the tire equatorial region PE, the angle of the cords $C_4$ of the auxiliary belt layer 4 with respect to the tire equatorial plane E is preferably 90° in terms of improving the steering stability of the tire.

In the disclosed tire, the cords $C_4$ of the auxiliary belt layer 4 preferably extend in the direction in which the inclination angle with respect to the tire circumferential direction gradually decreases from the ¼ position toward the end 4e of the auxiliary belt layer.

In other words, the cords $C_4$ gradually decrease in inclination angle so that the inclination angle β of the tangent line at a point $m_3$ in the end 4e of the auxiliary belt layer with respect to the tire circumferential direction is smaller than the inclination angle α of the tangent line at the point $m_2$ in the ¼ position of the auxiliary belt layer 4 with respect to the tire circumferential direction, as illustrated in FIG. 3.

In this case, the cords $C_4$ in the tread side region S extend along the tire circumferential direction as compared with the cords $C_4$ in the tread middle region M. Such an auxiliary belt layer 4 can supplement insufficient rigidity in the tire circumferential direction in the tread side region S caused by the absence, in part of the tread side region S, of the belt layer 3 made up of cords extending in the tire circumferential direction. This reduces the difference in rigidity between the tread middle region M and the tread side region S more effectively, thus improving steering stability during turning and enhancing the effect of suppressing uneven wear of the tread 6.

The inclination angle β of the cords $C_4$ of the auxiliary belt layer 4 with respect to the tire circumferential direction in the end 4e of the auxiliary belt layer is preferably 70° or more and 85° or less.

This structure further improves steering stability during turning, and suppresses uneven wear of the tread 6 more reliably.

Here, the inclination angle β is set to 70° or more in order to ensure sufficient rigidity in the tread side region S to the lateral force during turning, and set to 85° or less in order to supplement rigidity in the tire circumferential direction in the tread side region S due to the absence of the belt layer 3.

Figure 4:
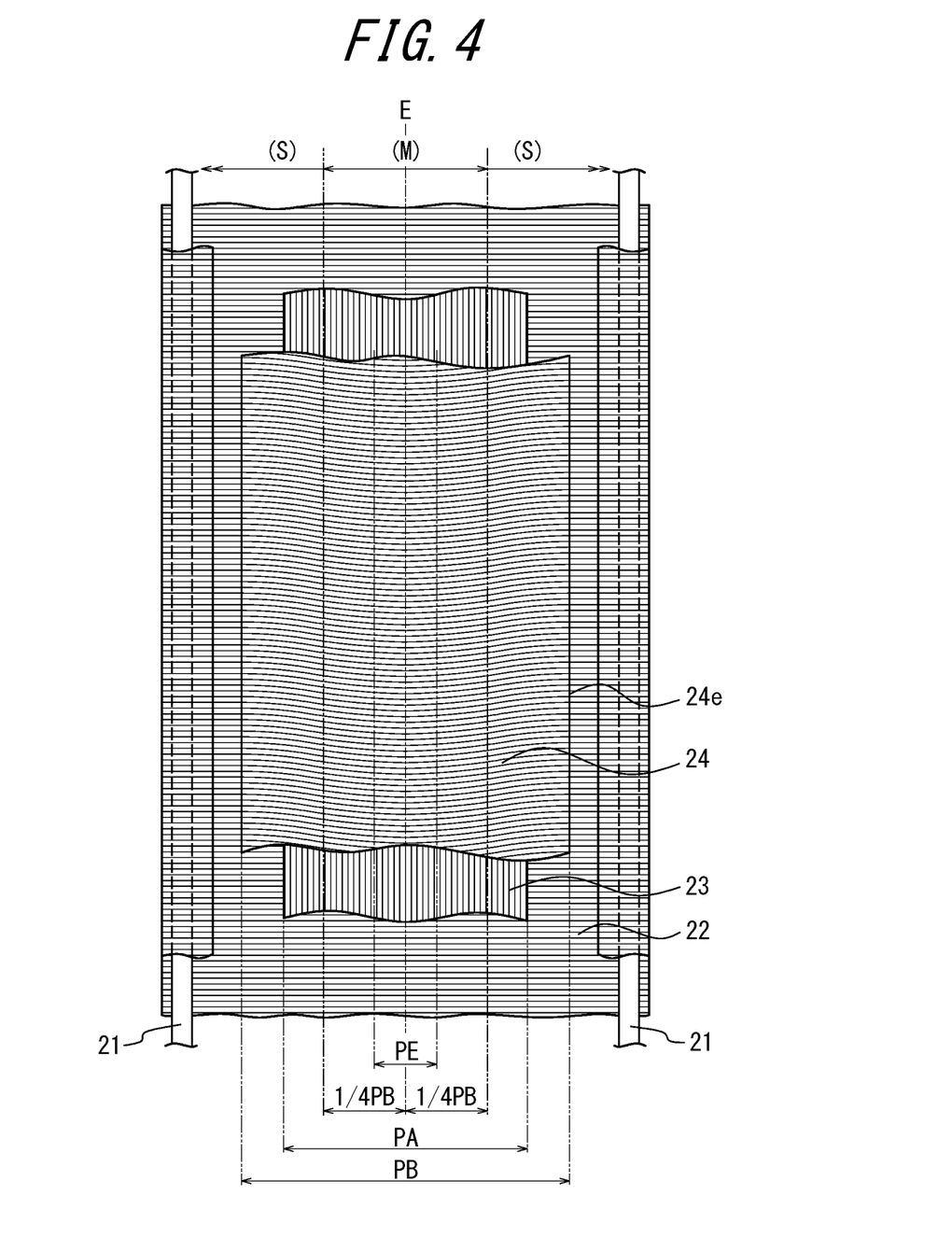
FIG. 4 is a partial development plan view illustrating the internal structure of a motorcycle tire according to another one of the embodiments.

The following describes the internal structure of a tire according to another one of the embodiments, with reference to FIG. 4. The same components as those of the foregoing tire illustrated in FIGS. 1 to 3 are given the same reference signs as in FIGS. 1 to 3, and their description is omitted. A tire illustrated in FIG. 4 has the structure illustrated in the cross-sectional view in the tire width direction in FIG. 1.

Cords $C_{24}$ of an auxiliary belt layer 24 in the disclosed tire preferably have an inflection point in the above-mentioned ¼ position or outward from the ¼ position in the tire width direction, and extend in the direction in which the inclination angle with respect to the tire circumferential direction gradually increases toward the end 24e of the auxiliary belt layer.

Figure 5:
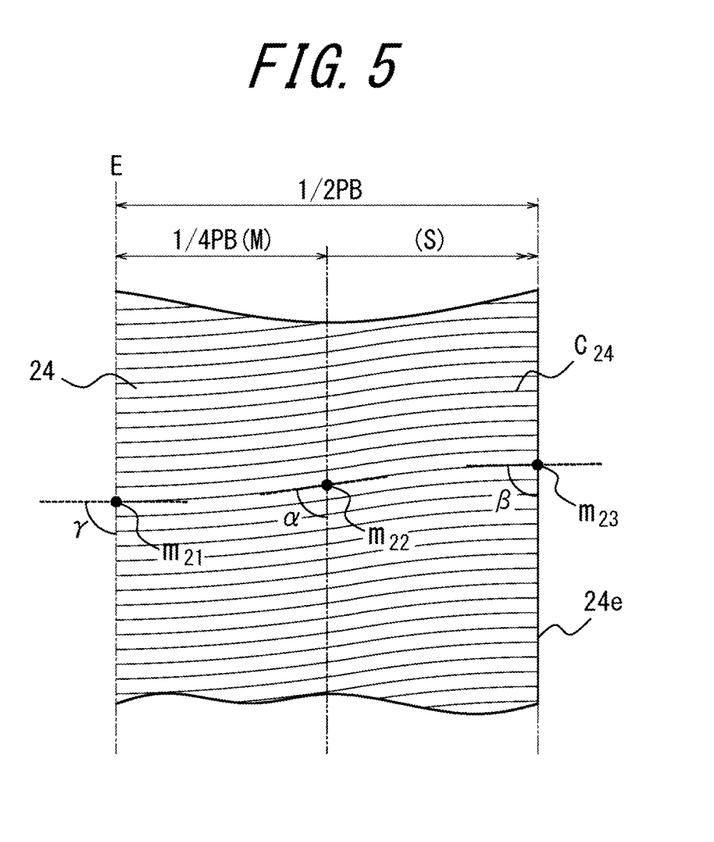
FIG. 5 is an enlarged view of a part in FIG. 4.

In other words, for example, the cords $C_{24}$ of the auxiliary belt layer 24 gradually decrease in inclination angle so that the inclination angle α of the tangent line at a point $m_{22}$ in the ¼ position with respect to the tire circumferential direction is smaller than the inclination angle γ of the tangent line at a point $m_{21}$ in the tire equatorial plane E with respect to the tire circumferential direction and then start gradually increasing in inclination angle at the ¼ position or any position outward from the ¼ position in the belt width direction (the ¼ position in the example in FIGS. 4 and 5), thus extending like an S-shaped curve between the tire equatorial plane E and the end 24e of the auxiliary belt layer 24, as illustrated in FIG. 5 which partially enlarges the partial development view in FIG. 4.

Typically, the effect of lateral force is greater during turning when the vehicle body is significantly leaned to the road surface than during straight running when the vehicle body is not leaned much. With the aforementioned structure, during turning when the vehicle body is significantly leaned, the extension direction of the cords $C_{24}$ of the auxiliary belt layer approaches the direction of the lateral force input to the tread 6 due to the centrifugal force, as a result of which the rigidity of the tread side region S to the lateral force increases. This increases traction grip when accelerating from deep cornering during which the vehicle body is significantly leaned, and so improves traction performance.

The inclination angle β of the cords $C_{24}$ of the auxiliary belt layer 24 in the end 24e of the auxiliary belt layer is preferably 70° or more and 90° or less. When the inclination angle β of the cords $C_{24}$ is within this range, the aforementioned traction grip can be increased to improve traction performance more effectively. Here, the inclination angle β is set to 70° or more in order to ensure sufficient rigidity to the lateral force during turning.

The disclosed tire is suitably used as a rear tire. With reference to the plan view in FIG. 2, when the tire is mounted so as to rotate in the downward direction on the paper surface of FIG. 2, the performance described above can be achieved effectively.

Moreover, when the periphery width PA of the belt layer 3 and the periphery width WT of the tread surface T satisfy the relationship 0.5≤PA/WT≤0.9, the belt layer 3 is present throughput the required range of the tread portion 13 in the cross section in the tire width direction, so that excellent turning performance including cornering force and road surface gripping force can be achieved.

In the case where PA/WT<0.5, the belt layer 3 is narrow, which may decrease the lateral force and cause lower turning performance during turning. In the case where PA/WT>0.9, the belt layer 3 is wide relative to the tread footprint, which may reduce the footprint area and hinder sufficient improvement of turning performance.

Moreover, when the periphery width PB of the auxiliary belt layer 4 and the periphery width PA of the belt layer 3 satisfy the relationship 1.0<PB/PA≤2.0, excellent turning performance can be achieved.

In the case where PB/PA≤1.0, the wide belt layer 3 reduces the footprint area of the tread footprint and makes it impossible to achieve desired turning performance. In the case where PB/PA>2.0, the auxiliary belt layer 4 is present throughout a wide range in the tire width direction relative to the belt layer 3. This may cause excessively high rigidity of the tire, and make it impossible to improve turning performance as desired.

When the cords forming the belt layer 3 are steel cords and the cords forming each of the carcass 2 and auxiliary belt layer 4 which sandwich the belt layer 3 in the tire radial direction are organic fiber cords, out-of-plane bending rigidity in the cross section in the tire width direction can be enhanced significantly, and the weight of the tire can be reduced.

Examples

The following describes examples according to the disclosure.

Example tires and Comparative Example tires were experimentally produced and subjected to performance evaluation. The tire size is 180/55ZR17.

Example tire 1 has the structure illustrated in FIGS. 1 to 3. Its specifications are shown in Table 1.

Figure 6:
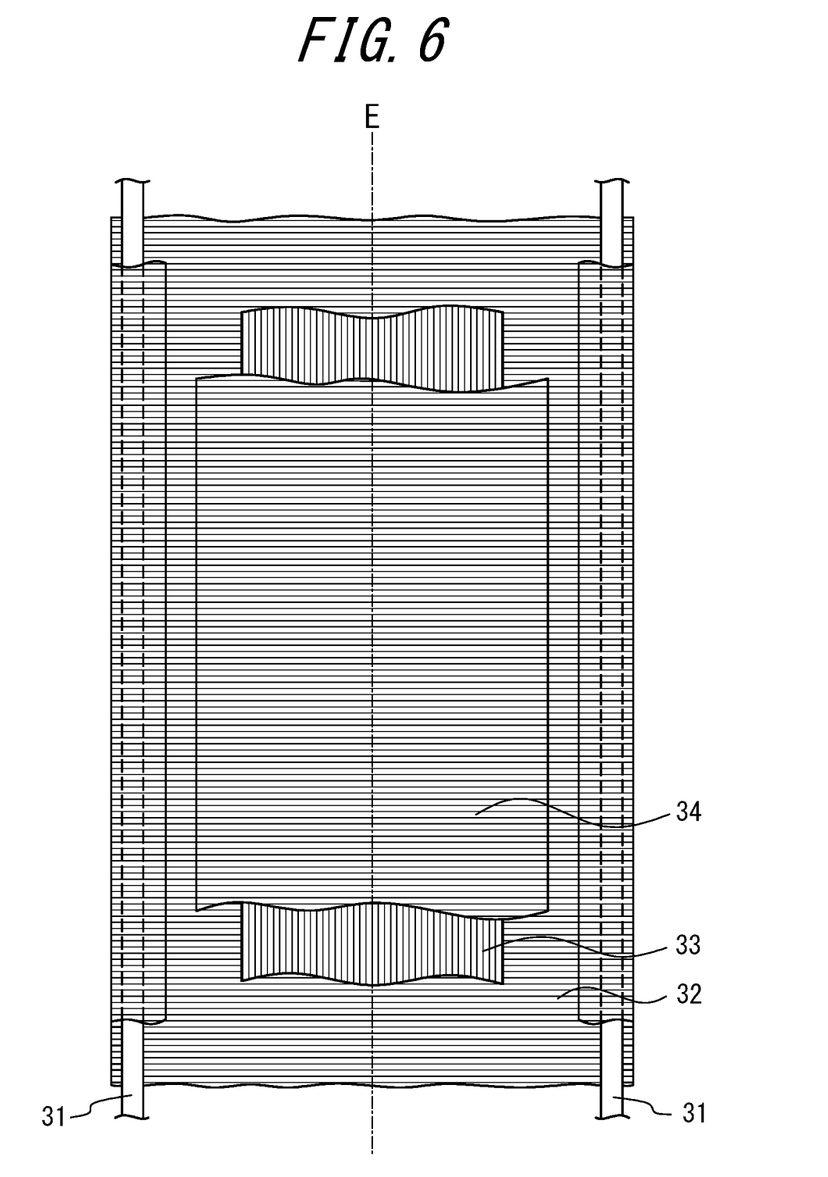
FIG. 6 is a partial development plan view illustrating a reinforcing structure of a conventional tire.

Comparative Example tire 1 is a tire without the auxiliary belt layer 4. Comparative Example tire 2 is a tire having a reinforcing structure illustrated in FIG. 6.

Example tires 2 to 4 are the same as Example tire 1 except that the inclination angles α and β of the cords $C_4$ of the auxiliary belt layer with respect to the tire circumferential direction are changed as shown in Table 1.

Example tires 5 to 8 are the same as Example tire 1 except that they have the structure illustrated in FIGS. 1, 4, and 5 and the inclination angles α and β of the cords $C_4$ of the auxiliary belt layer with respect to the tire equatorial plane E are changed as shown in Table 1.

In Table 1, "inclination angle α" and "inclination angle β" are each the inclination angle with respect to the tire circumferential direction.

(Steering Stability)

Each sample tire was attached to the applicable rim, filled to the predetermined internal pressure, mounted as the rear wheel of a motorcycle, and subjected to a test run on a test course by an experienced test driver. The evaluation was subjectively made by the test driver. Table 1 shows the evaluation results as indices with the result of Comparative Example tire 1 being 100, where a larger value denotes better performance.

(Traction Grip)

Each sample tire was tested by the same method as the steering stability test. The evaluation was subjectively made by the test driver. Table 1 shows the evaluation results as indices with the result of Comparative Example tire 1 being 100, where a larger value denotes better performance.

(Uneven Wear Resistance)

After the real vehicle running in the steering stability test and the traction grip test, the depth of the remaining groove located closest to the tread end from among the grooves formed in the tread surface of the tire was measured to determine the uneven wear resistance. Table 1 shows the evaluation results as indices with the result of Comparative Example tire 1 being 100, where a larger value denotes better performance.

TABLE 1

| | Auxiliary belt layer | | | | | | | | Uneven |
|---|---|---|---|---|---|---|---|---|---|
| | Inclination angle γ (°) | Inclination angle α (°) | Inclination angle β (°) | Shape | Material | Belt layer Material | Steering stability | Traction grip | wear resistance |
| Comp. Ex. 1 | — | — | — | — | — | Steel | 100 | 100 | 100 |
| Comp. Ex. 2 | 90 | 90 | 90 | FIG. 6 | Kevlar ® | Steel | 109 | 109 | 110 |
| Ex. 1 | 90 | 60 | 70 | FIG. 2 | Kevlar ® | Steel | 110 | 110 | 110 |
| Ex. 2 | 90 | 70 | 60 | FIG. 2 | Kevlar ® | Steel | 110 | 111 | 110 |
| Ex. 3 | 90 | 75 | 70 | FIG. 2 | Kevlar ® | Steel | 110 | 112 | 112 |
| Ex. 4 | 90 | 85 | 80 | FIG. 2 | Kevlar ® | Steel | 110 | 115 | 115 |
| Ex. 5 | 90 | 60 | 80 | FIG. 4 | Kevlar ® | Steel | 110 | 125 | 115 |
| Ex. 6 | 90 | 70 | 85 | FIG. 4 | Kevlar ® | Steel | 110 | 120 | 120 |
| Ex. 7 | 90 | 75 | 85 | FIG. 4 | Kevlar ® | Steel | 110 | 117 | 117 |
| Ex. 8 | 90 | 85 | 90 | FIG. 4 | Kevlar ® | Steel | 110 | 112 | 110 |

REFERENCE SIGNS LIST 1, 21, 31 bead core
2, 22, 32 carcass
3, 23, 33 belt layer
4, 24, 34 auxiliary belt layer
4e, 24e end of auxiliary belt layer
6 tread
11 bead portion
12 sidewall portion
13 tread portion
$C_4$, $C_{24}$ cords of auxiliary belt layer
E tire equatorial plane
PA periphery width of belt layer
PB periphery width of auxiliary belt layer
PE tire equatorial region
T tread surface
TW periphery width of tread surface

The invention claimed is:

1. A motorcycle tire that includes, as a frame, a carcass made up of one or more radial carcass plies toroidally extending between a pair of bead portions, and includes, on an outer circumferential side of a crown region of the carcass, a belt layer made up of a plurality of rubber-coated cords, a single auxiliary belt layer made up of a plurality of rubber-coated cords, and a tread rubber in the stated order, a periphery width of the auxiliary belt layer being greater than a periphery width of the belt layer, wherein the cords of the auxiliary belt layer extend in a direction in which an inclination angle of the cords of the auxiliary belt layer with respect to a tire circumferential direction gradually decreases from each of both ends of a tire equatorial region including a tire equatorial plane toward a corresponding ¼ position which is at a distance of ¼ of the periphery width of the auxiliary belt layer from the tire equatorial plane along a periphery of the auxiliary belt layer, and the inclination angle in the ¼ position is 60° or more and 85° or less, and the inclination angle of the cords of the auxiliary belt layer in an end of the auxiliary belt layer is 70° or more and 85° or less.

2. A motorcycle tire that includes, as a frame, a carcass made up of one or more radial carcass plies toroidally extending between a pair of bead portions, and includes, on an outer circumferential side of a crown region of the carcass, a belt layer made up of a plurality of rubber-coated cords, a single auxiliary belt layer made up of a plurality of rubber-coated cords, and a tread rubber in the stated order, a periphery width of the auxiliary belt layer being greater than a periphery width of the belt layer, wherein the cords of the auxiliary belt layer extend in a direction in which an inclination angle of the cords of the auxiliary belt layer with respect to a tire circumferential direction gradually decreases from each of both ends of a tire equatorial region including a tire equatorial plane toward a corresponding ¼ position which is at a distance of ¼ of the periphery width of the auxiliary belt layer from the tire equatorial plane along a periphery of the auxiliary belt layer, and the inclination angle in the ¼ position is 60° or more and 85° or less, and the cords of the auxiliary belt layer have an inflection point in the ¼ position or outward from the ¼ position in a tire width direction, and extend in a direction in which the inclination angle gradually increases from the inflection point toward an end of the auxiliary belt layer.

3. The motorcycle tire according to claim 2,
wherein the inclination angle of the cords of the auxiliary belt layer in the end of the auxiliary belt layer is 70° or more and 90° or less.

\* \* \* \* \*